United States Patent [19]

MacDonnell et al.

[11] 3,854,417
[45] Dec. 17, 1974

[54] AUTOMATIC VISUAL HAND BRAKE SYSTEM

[75] Inventors: Robert W. MacDonnell, Crete; Otto A. Shander, Chicago Heights, both of Ill.

[73] Assignee: R. W. Mac Company, Crete, Ill.

[22] Filed: Mar. 13, 1974

[21] Appl. No.: 450,874

[52] U.S. Cl. ............ 105/1 A, 105/238, 116/132 R, 188/1 A
[51] Int. Cl. ........................................... B61d 49/00
[58] Field of Search ........... 105/1 A, 238; 246/473; 188/1 A; 116/132 R, 132 A; 303/86

[56] References Cited
UNITED STATES PATENTS
2,134,299   10/1938   Cosner ............................ 116/132 R
3,234,892   2/1966    Lunde ............................. 116/132 R
3,691,982   9/1972    Hawthorne ........................... 303/86

*Primary Examiner*—M. Henson Wood, Jr.
*Assistant Examiner*—Richard A. Bertsch
*Attorney, Agent, or Firm*—J. Patrick Cagney

[57] ABSTRACT

An automatic visual hand brake indicator system for truck mounted and conventional type hand brakes provides indicator flags that move between an OFF position adjacent the car and an ON position projecting beyond the sides of the car to be visible from anywhere alongside a track or train of cars.

8 Claims, 4 Drawing Figures

PATENTED DEC 17 1974

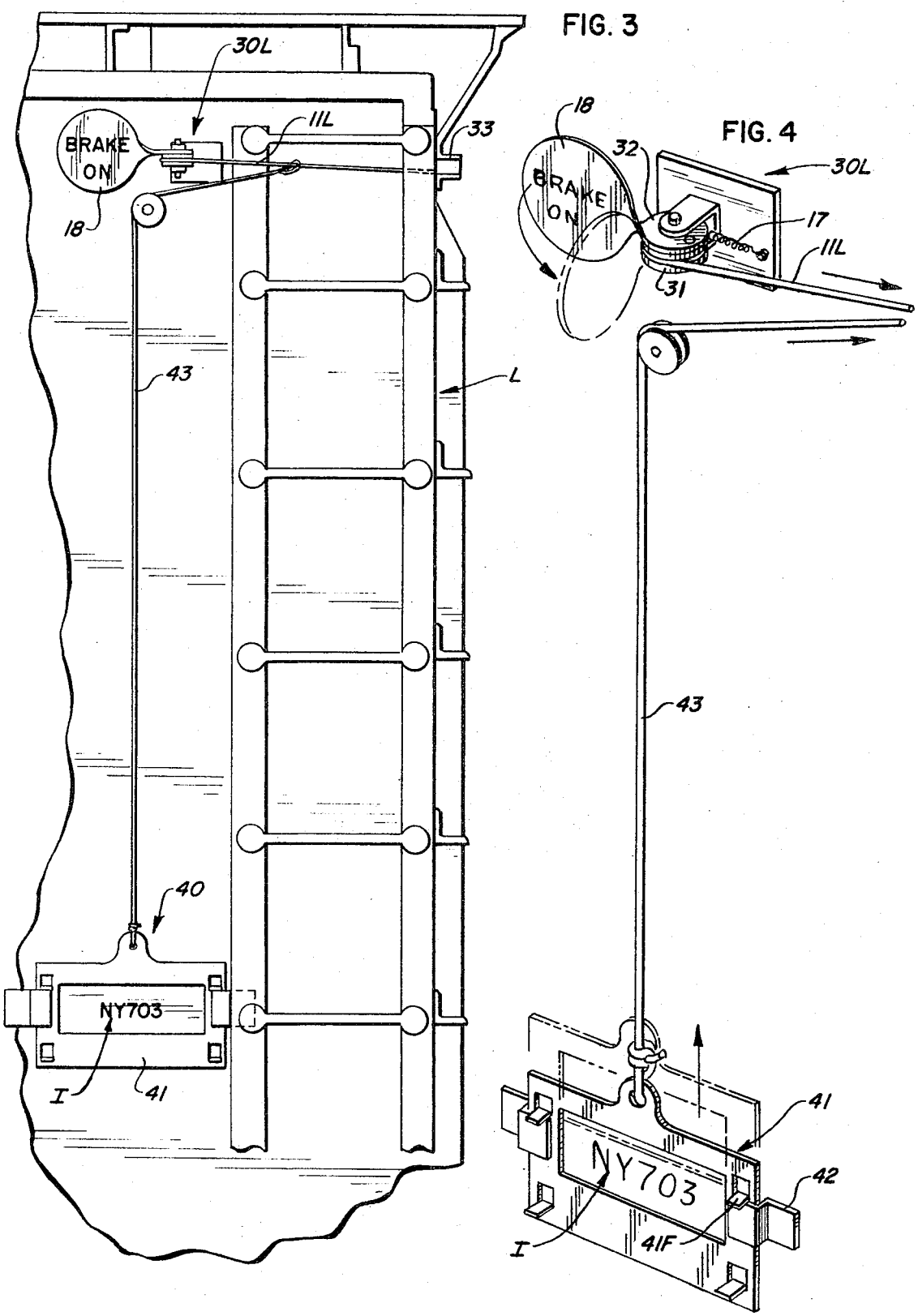

AUTOMATIC VISUAL HAND BRAKE SYSTEM

BACKGROUND OF THE INVENTION

Truck mounted hand brakes for the B end of a freight car cause particularly serious repair problems when the hand brake is accidentally left on.

In some instances where the brakes hold the wheels locked, the wheels are slid flat leading to a wheel change or even to a broken wheel and a possible derailment.

Sometimes, the brake heads are melted through by excessive heat requiring change of the truck mounted brake beam and air brake cylinders.

More commonly, the brake shoes are overheated and burned out.

Even with conventional hand brakes, the repair costs where the brake is left on can be substantial.

There is a need for an effective indicator that shows when a hand brake has been left on.

SUMMARY OF THE INVENTION

The present invention provides an automatic visual hand brake indicator system suitable both for truck mounted and conventional type hand brakes. The indicator system is directly adaptable to existing hand brake installations requiring no changes therein and causing no interference with normal operation thereof.

More particularly, the invention consists of a hand brake indicator arrangement for connection to a hand brake and having an indicator flag mounted on a car end or car side wall, drive means for shifting the flag between an OFF position adjacent the car wall and an ON position projecting sideways beyond the car to be visible from anywhere alongside a train or track of cars, and actuator means connected between the hand brake and the drive means and including a series connected take-up spring to accommodate differences in travel of said hand brake and said drive means in moving between ON and OFF positions.

In the preferred practice of the invention, a separate indicator unit is provided for each side of the car and the actuator means utilizes a common take-up spring that is connected through separate branch lines to the indicator units.

Each indicator unit includes a spring means normally biasing the drive means to shift the flag towards the off position to provide automatic return of the indicator flag when the hand brake is released.

The indicator system not only reduces the possibility of a hand brake being left on but it facilitates supervisory control for connecting such errors and for identifying the particular car that was subjected to possible damage.

The system is adaptable to various car end configurations without modification of the major components.

It is also contemplated to provide an indicator system that functions to mask the I.C. identification number to allow for automatic sensing of the brake-on condition.

Other features and advantages of the invention will be apparent from the following description and claims and are illustrated in the accompanying drawings which show structure embodying preferred features of the present invention and the principles thereof, and what is now considered to be the best mode in which to apply these principles.

BRIEF DESCRIPTION OF THE DRAWINGS

In the accompanying drawings forming a part of the specification, and in which like numerals are employed to designate like parts throughout the same:

FIG. 3 is an elevational view showing a side mount indicator arrangement in the brake-off position; and FIG. 4 is a perspective view showing the operation of the FIG. 3 arrangement.

DESCRIPTION OF PREFERRED EMBODIMENTS

Figure 1:
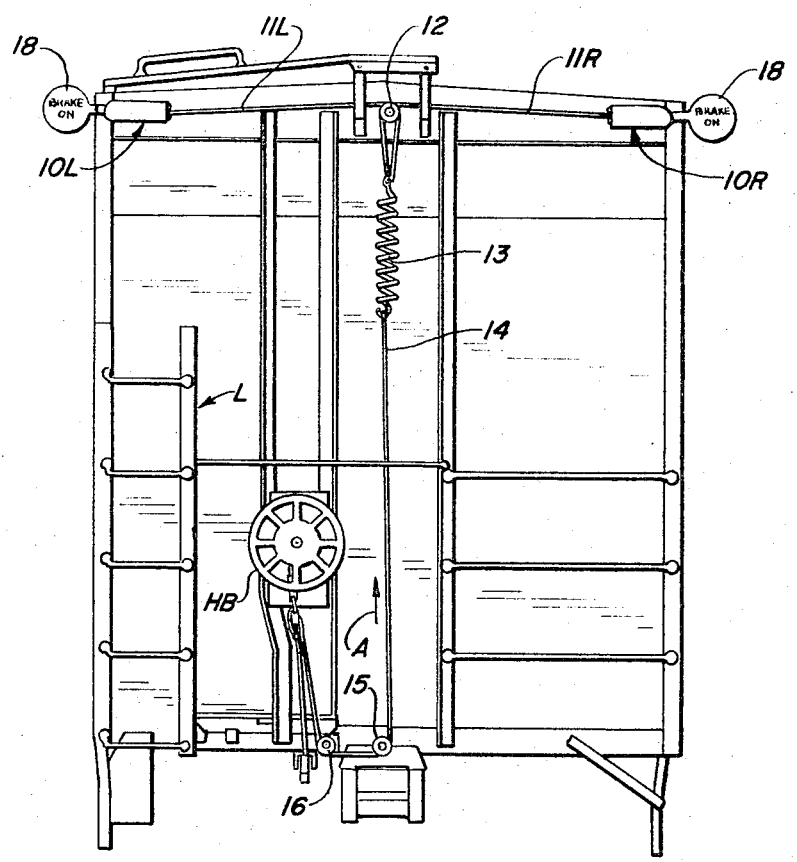
FIG. 1 is an elevational view of the B-end of a freight car showing the hand brake indicator system installed thereon.

Referring now to the drawings, the B-end of a freight car is shown where the end ladder L is spaced 3 feet from the top of the car and where the truck mounted hand brake HB is located near the mid height of the ladder L. The indicator system in this embodiment includes a pair of end mounted indicator units 10L, 10R located at the upper corners of the car end.

Each indicator unit is connected through a separate cable 11L, 11R trained about a couble pulley unit 12 at the top center of the car end. The cable ends are tied to the upper end of a floating tension spring 13 that has its lower end connected through a common cable 14 that is trained about spaced pulleys 15, 16 at the bottom of the car end. The cable 14 is tied to the clevis C at the end of the hand brake chain.

As illustrated in FIG. 1, the hand brake HB is at its fully clockwise position and is ON and its chain and bell crank are shown in their UP positions. A tension load is applied to the cable 14 by the hand brake as indicated by the arrow A and the tension spring 13 is fully extended. In the BRAKE-OFF position, the clevis C on the chain of the hand brake is near the elevation of the pulley 16 while the spring 13 moves only a slight distance upwardly toward the pulley 12.

There is a substantial difference in these travel distances which is taken up by changes in the length of the spring 13. Within the housing of the indicator 10L the remote end of the cable 11L is anchored to a spring 17 that holds the cable system taut under all conditions to securely retain the cables on the pulleys.

Figure 2:
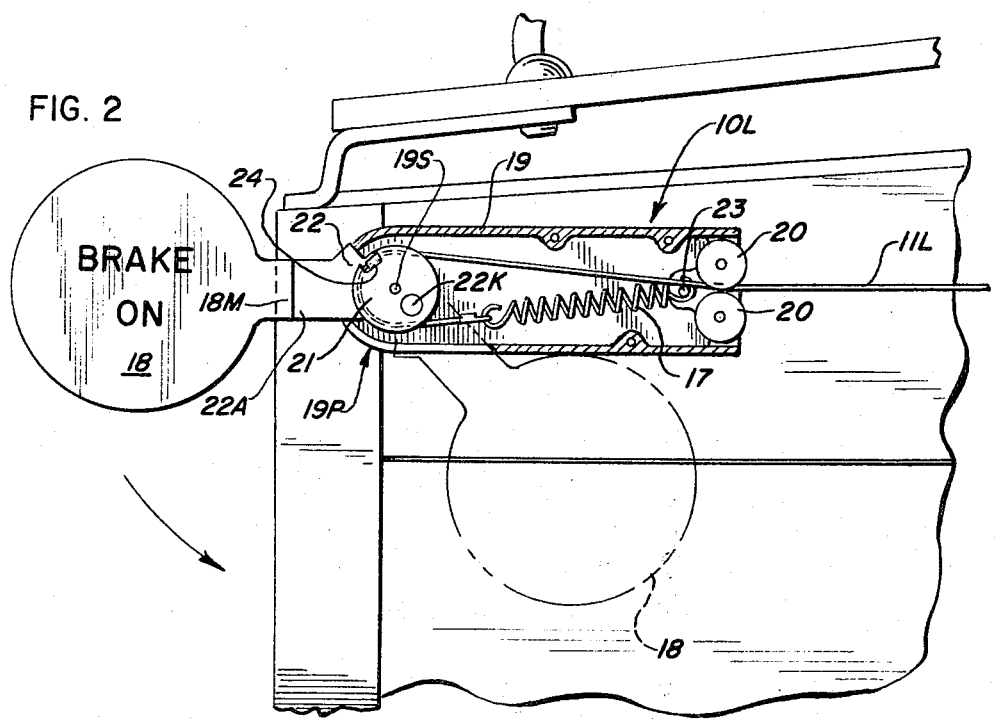
FIG. 2 is an enlarged view showing an end mount indicator unit.

Each indicator unit includes an indicator flag 18 which has a BRAKE ON position as shown in FIGS. 1 and 2 wherein it projects outwardly of the car side. The OFF position for the flag is shown in dotted lines in FIG. 2 wherein it is inwardly of the car side.

The indicator unit includes a housing 19 secured to the car wall and rotatably mounting a pair of alignment pulleys 20 at the exit end and a main drive pulley 21 at the other end. The drive pulley 21 is keyed to rotate on a stub shaft 19S in unison with a support casting 22 that includes an arm 22A projecting through a peripheral slot 19P in the housing and mounting the flag 18 for swinging movement. Keying is accomplished by providing a side face hole in the pulley that receives a lateral post 22K on the support. The pair of alignment pulleys 20 allow the cable entry angle to be anywhere within a 180° range, enabling the system to be applied in various configurations without requiring any part modifications.

The spring 17 for anchoring the indicator end of the tension line is located within the housing 19 and has one end tied to a stationary post 23. The end of the cable that is trained about the indicator drive pulley 21 is provided with an interlock fitting 24 such as a ring or knob permanently staked thereto. The fitting 24 is seated in a peripheral notch on the drive pulley and remains therein at all operating positions of the system to cause the spring 17 on the indicator end of the system to act directly on the drive pulley for returning the indicator flag to the OFF position when the hand brake is released. The flag 18 is made of a coated molded rubber composition and has its main body provided with pressure sensitive indicator decals to be easily visible by day and even at night after a person's eyes become dark adapted. The main body of the flag is carried by a laterally projecting mounting sleeve 18M that telescopes over the support arm 22A in a secure friction fit to enable flexing of the main body in the event of accidental contact.

In the preferred construction, all the pulleys are of lubric plastic and do not require oiling, the housings are of aluminum to be rust free and the cables are stainless steel aircraft-type. Thus, the system is substantially maintenance free and, in addition, all of the parts can be replaced on the car in the event of damage.

When the hand brake is applied by turning the hand wheel clockwise, the cable 14 is pulled through the lower guide pulleys 15, 16 and acts to elongate the floating spring 13. The load is transmitted through the spring 13 to pull the cables 11L, 11R around the double pulley 12 and rotate the corresponding drive pulley that is keyed to the swing arm support that carries the corresponding flag to swing the flags 18 to the ON position.

When the hand brake is released, the return spring 17 within each indicator unit retracts the cable which carries the fitting 24 that interlocks with the drive pulley 21 to directly effect return of the flags to the OFF position.

It should be understood that the use of the indicators enables a train master or yard master to check all inbound trains and record the car number and location for any car that has the indicators in the ON position. Outbound trains can be stopped, the hand brakes released and the car numbers recorded.

In addition to the ease of supervision, the incidence of accidentally leaving the hand brakes ON will decrease because of the very presence of the indicator units and because of the more effective supervisory control that is possible. For these reasons, the indicator system makes it possible to substantially reduce the costs to the railroad due to sheel and brake beam changes, brake shoe replacements, lost revenue or disabled cars and possible train derailments.

There are some car end configurations where the ladder location or other factors make it preferable to locate the one or both of the indicator flags on the car side as shown in FIG. 3 rather than on the car end as shown in FIG. 1.

The side mount indicator 30L for the left hand side wall, as shown without the housing cover in FIGS. 3 and 4 includes a drive pulley 31 similarly keyed to a support arm 32 that carries the indicator flag 18 in a similar fashion. The cable 11L is trained about a corner pulley 33 and leads behind the side mount ladder L and around the drive pulley 31 in keyed relation thereto to anchor through a tension spring 17. The operation of the side mount indicator system is essentially the same as for the end mount system.

A separate indicator 40 mounted on the car side is also shown in FIGS. 3 and 4. The indicator 40 includes a picture frame type flag 41 mounted for vertical shifting movement between an OFF position as shown in full lines and an ON position as shown in phantom lines. The flag 41 has struck-up flanges 41F acting as stops relative to fixed brackets 42 on the car side to set the limit positions of movement.

Where the indicator cable 43 is tied to the same system as the indicator 30L, the return spring 17 will assist the indicator flag 41 so that it can return to the OFF position by gravity upon brake release. Where operating independently, or merely for insuring more positive return to OFF, a return spring is provided to bias the indicator downwardly.

When the indicator 41 is in the OFF position the I.C.C. indicia I which are photoelectrically monitored are visible in the conventional way. When the indicator is in the ON position the I.C.C. indicia I are partially masked to enable automatic monitoring of the hand brake setting.

Thus, while preferred constructional features of the invention are embodied in the structure illustrated herein, it is to be understood that changes and variations may be made by those skilled in the art without departing from the spirit and scope of the appended claims.

What is claimed is:

1. An automatic indicator system for a railway car having a truck mounted or conventional type B-end hand brake that has a hand wheel operable in a brake applying direction to take up a brake actuator chain and operable in a brake release direction to pay out the chain, said indicator system comprising an indicator flag, drive means for shifting the flag between an OFF position adjacent the car and an ON position projecting sideways beyond the car to be visible from anywhere alongside a train or track of cars, and actuator means connected under tension between said drive means and said chain and including a series connected take-up spring to accommodate differences in travel of said hand brake chain and said drive means in moving between ON and OFF positions.

2. An automatic indicator system as defined in claim 1 and including a second flag, a second drive means for shifting the second flag between an OFF position adjacent the car and an ON position projecting sideways beyond the other side of the car, said actuating means having a common portion including said take-up spring and having separate connections from said common portion to each of said drive means.

3. An automatic indicator system as defined in claim 2 and including spring means for actuating both drive means to return the flags to OFF position when the hand brake is operated in a brake release direction.

4. An automatic indicator system as defined in claim 1 and including spring means for actuating the drive means to return the flag to OFF position when the hand brake is operated in a brake release direction.

5. An automatic indicator system as defined in claim 1 wherein said drive means is a pulley, said actuating means includes a flexible cable trained around said pulley in interlocking relation therewith and anchored through a return spring that maintains tension on said cable to return the drive means and flag when the hand brake is operated in a brake release direction.

6. An automatic indicator system as defined in claim 1 and including separate indicator means mounted on the side of the car to shift between an OFF position for exposing I.C.C. identification indicia on the side of the car and an ON position for masking said indicia, and means connected between said actuator means and said separate indicator means for operating the separate indicator means and said drive means.

7. An automatic indicator system for a railway car having a truck mounted or conventional type B-end hand brake that has a hand wheel operable in a brake applying direction to take up a brake actuator chain and operable in a brake release direction to pay out the chain, said indicator system comprising an indicator flag, means for shifting the flag between an OFF position wherein I.C.C. car identification indicia are exposed and an ON position wherein I.C.C. car identification indicia are mashed, and actuator means connected under tension between said flag and said chain and including a series connected take-up spring to accommodate differences in travel of said hand brake and said flag in moving between ON and OFF positions.

8. An automobile indicator system as defined in claim 7 and including spring means to bias the actuating means to move in a direction to allow the flag to return to OFF position when the hand brake is operated in a brake release direction.

* * * * *